United States Patent [19]

Ishikawa

[11] 3,942,745
[45] Mar. 9, 1976

[54] TAPE REEL DRIVE APPARATUS WITH DRIVING TORQUE CONTROL MECHANISM

[75] Inventor: Yasuyuki Ishikawa, Kawaguchi, Japan

[73] Assignee: Canon Kabushiki Kaisha, Tokyo, Japan

[22] Filed: Aug. 1, 1974

[21] Appl. No.: 493,842

[30] Foreign Application Priority Data
Aug. 2, 1973    Japan................................ 48-87042
Aug. 6, 1973    Japan................................ 48-88148

[52] U.S. Cl................................. 242/201; 242/207
[51] Int. Cl.²...................... G03B 1/04; G11B 15/32
[58] Field of Search................... 242/198, 200–205, 242/207, 67.5, 75.5; 64/23

[56] References Cited
UNITED STATES PATENTS

| | | | |
|---|---|---|---|
| 3,643,469 | 2/1972 | Enomoto | 64/23 |
| 3,695,552 | 10/1972 | Guyton et al. | 242/198 |
| 3,727,856 | 4/1973 | Kitch | 242/75.5 |
| 3,858,828 | 1/1975 | Bundschuh et al. | 242/207 X |

*Primary Examiner*—Leonard D. Christian
*Attorney, Agent, or Firm*—Toren, McGeady and Stanger

[57] ABSTRACT

An apparatus for driving a reel-to-reel system in which the tape web such as magnetic sound tape for a player-recorder and film strip for a cine camera is wound onto one reel from another is provided with means forming part of a motion transmitting mechanism for imparting constantly changing driving torque to the reel driving means during the reeling operation. The driving torque control mechanism is provided with a movable member responsive to an insertion and a removal of a tape cassette into and from a cassette chamber and arranged to move it into and out of operative relationship with the motion transmitting mechanism respectively.

16 Claims, 8 Drawing Figures

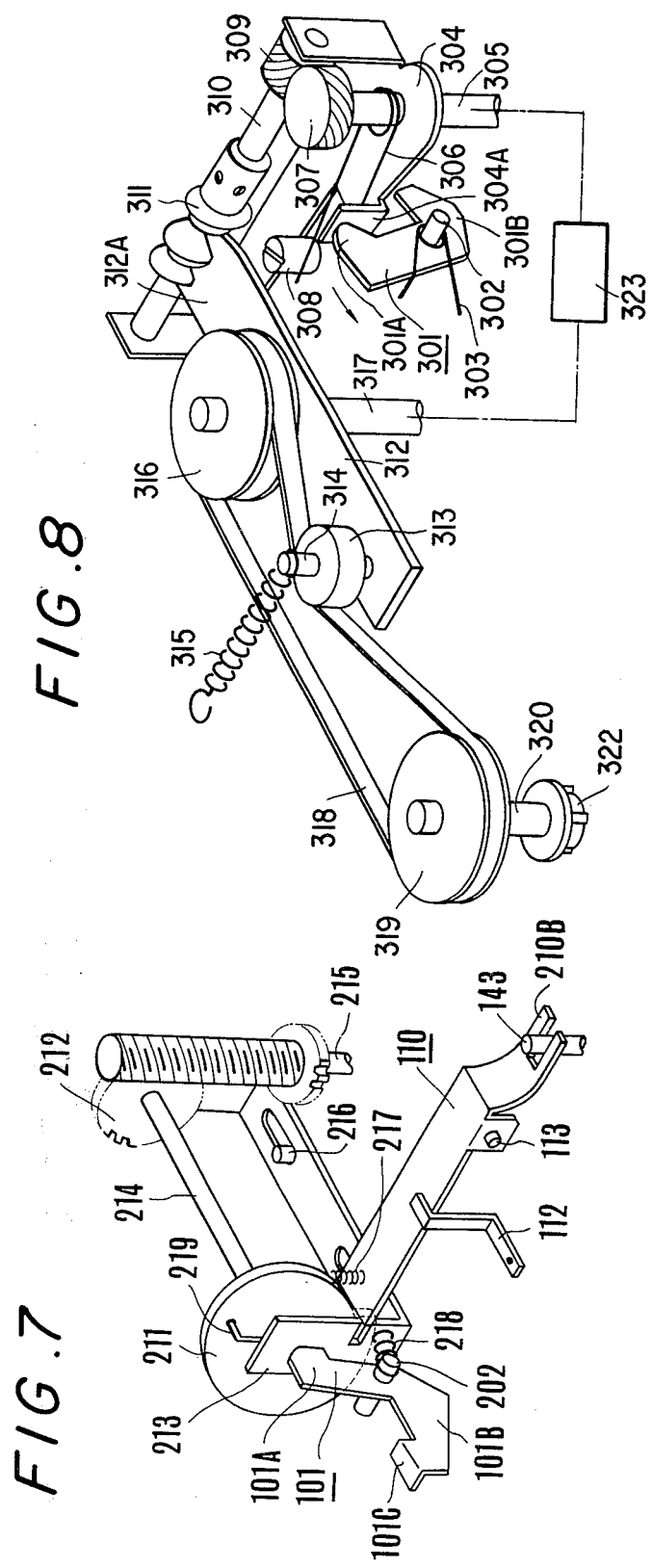

TAPE REEL DRIVE APPARATUS WITH DRIVING TORQUE CONTROL MECHANISM

BACKGROUND OF THE INVENTION

1. Field of the Invention

This invention relates to apparatus for driving a winding reel to take up a web material from an unwinding reel, and more particularly to a mechanism for controlling the driving torque force applied to the web transport mechanism in accordance with the quantity of web material taken up on the winding reel.

2. Description of the Prior Art

It is generally known that as a web material is pulled from an unwinding reel and is taken up on a winding reel, the driving torque necessary for the winding reel to take up the web material is gradually decreased with the increasing diameters of the core of web material on the winding reel as it winds in, the difference between driving torques in initial and final stages of the entire reeling operation being made larger with a longer length of the web material with a larger winding diameter of the entire web material wound on either reel.

With a film cassette, for example, in a cine camera, therefore, it is necessary to compensate for the difference in the driving torque so as to maintain constant the stress on the film strip between the reels during entire cassette operation, or otherwise, in an initial state of the reeling operation where the film transport mechanism is subject to a larger load, the unwinding reel is driven to rotate at a slower rate, while in a final state where the film transport mechanism is subject to a smaller load, it is driven to rotate at a faster rate, it being recognized that this kind of action not only seriously affects the quality of reproduction in image recordings, but sometimes gives rise to failure in image recordings.

Also in the case of player-recorders, similar problems to those described above are encountered, if not resolved by providing some means for controlling the driving torque in accordance with the varying winding diameters of the tape web on the winding reel, resulting not only in an unstability of sound records and reproductions, but also in sound discontinuity.

In order to accomplish the desired driving control of the reels, conventional motion picture cameras of large size adapted for use with 70 mm, 35 mm and 16 mm frame size film reels, and open reel type tape recorders of large size adapted for use with large-diameter reels have utilized a system for controlling the driving torque as the quantity of tape or film wound on the take up reel is varied. Such system results in an expensive, complex and bulky mechanism which is undesirable for use in cine cameras of compact type, for example, of 8 mm frame size as well as in tape recorders of compact type.

On the other hand, the system for travelling magnetic sound tape or film strip between a pair of reels which are enclosed in a cassette has found a wide acceptance in the fields of cine cameras of 8 mm frame size and tape recorders of compact type. Particularly, in the reel-to-reel system wherein one of the coplanar reels to which the respective ends of a tape web are attached is driven to take up the tape web from the other reel, the above-mentioned problems which make reliable cassette operation difficult to achieve remains unsolved. As a result, differential pulls arise with corresponding differences in rate of rotation of the reels owing to constantly changing diameters of the core of tape web on each reel as one unwinds and the other winds in, it not scarcely happening that such an action gives rise to breakage and damaging stresses on the tape web.

SUMMARY OF THE INVENTION

An object of the present invention is to provide a web reel drive apparatus which has resolved the above-mentioned conventional problems.

Another object of the present invention is to provide a web reel drive apparatus of simple structure and of low cost is adaptable to various types of web transport.

Still another object of the present invention is to provide a web reel drive apparatus provided with a mechanism for imparting constantly changing driving torques into web transport mechanism with ever increasing winding diameters of the web core on the winding reel as it winds in.

Other objects of the present invention will become apparent from the following detailed description taken in conjunction with the accompanying drawings.

BRIEF DESCRIPTION OF THE DRAWINGS

FIG. 7 is a fragmentary schematic perspective view of a fifth tape reel drive apparatus according to the invention.

FIG. 8 is a fragmentary perspective view of a sixth tape reel drive apparatus according to the invention.

DESCRIPTION OF THE PREFERRED EMBODIMENTS

Figure 1:
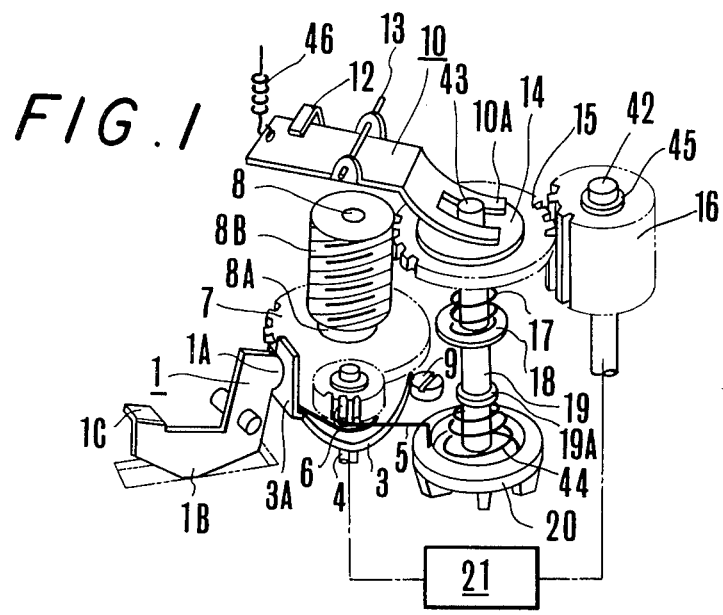
FIG. 1 is a schematic perspective view of a first tape reel drive apparatus according to the invention.
Figure 2:
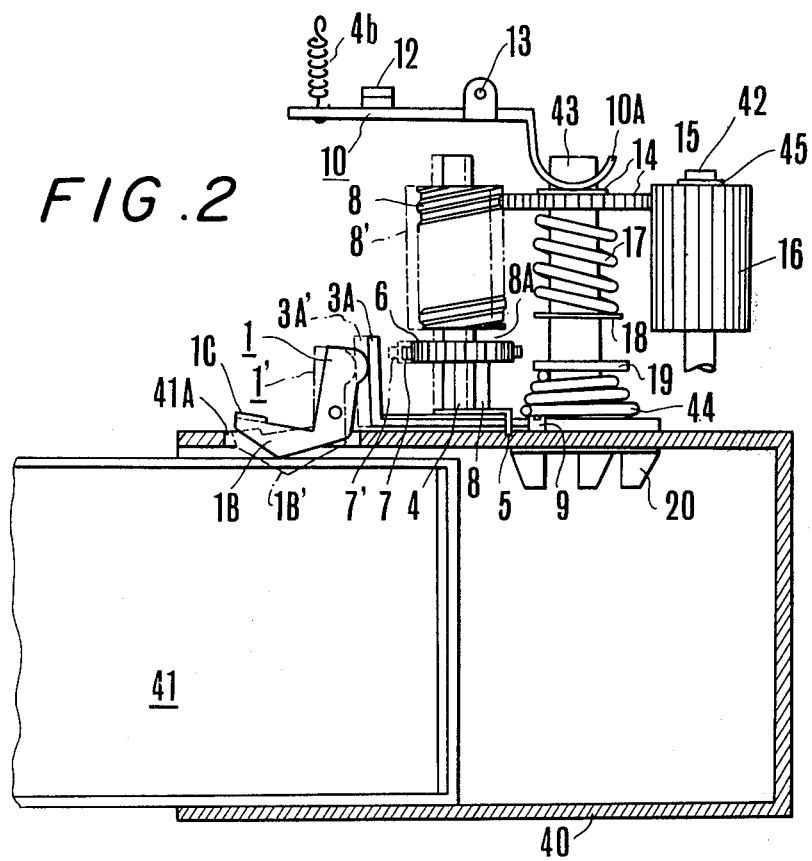
FIG. 2 is a fragmentary schematic partly elevational partly sectional view of the apparatus of FIG. 1 and a cooperative tape cassette 41 which is about to be loaded in a cassetted chamber 40.

Referring to FIGS. 1 and 2, there is shown one example of a tape reel drive apparatus according to one embodiment of the present invention adapted for use with a reel-to-reel type tape cassette. The tape reel drive apparatus includes a movable member in the form of a lever 1 having three projections 1A, 1B and 1C, mounted at a pivot axle 2 in the housing of the apparatus to be actuated in response to the insertion of a cassette into a cassette chamber in sliding engagement with the projection 1B extending into the cassette chamber through an opening provided through a portion of the cassette chamber wall. The projection 1C is arranged in the lever 1 to limit the counter-clockwise movement of the lever 1 when the cassette 41 is removed from the cassette chamber 40. The projection 1A normally engages an extension 3a of an one-armed guide lever 3, which is pivotable about a shaft 4 connected to motor drive means including a single motor indicated at 21 independently of rotation of the shaft 4, and which is biased in a counter-clockwise direction as viewed in FIG. 1 by a spring 5 which tends to urge the extension 3A against the projection 1A. Affixed to the shaft 4 is a first rotary drive pinion 6 engaging a spur gear 7 rotatably mounted on a shaft 8 extending from the guide lever 3. The shaft 8 has a cylindrical sleeve having a helical thread on its outer surface, thereinafter referred to as helix 8B affixed through a clamp 8A to the spur gear 7 for rotation therewith. For limiting the clockwise pivoting movement of the guide lever 3, there is provided a stopper 9. The parts 3, 4, 5, 6, 7, 8, 8A and 8B constitute part of the torque control mechanism according to the invention.

A mechanism for transmitting the motion of the motor drive means to the reel driving means comprises a spur gear 15 normally engaging a second rotary drive pinion 16 of which the shaft 42 is connected to the motor drive means 21. One of the gear teeth of spur gear 15 engages in the helical groove of the helix 8B when the guide lever 3 is set in the illustrated operative position. The spur gear 15 is mounted on a reel drive shaft 43 to be slidable movable along its axis as well as to be rotatable about it. The spur gear 15 carries a coaxial anti-friction disk 14 on which is abuttingly engaged a forked portion 10A of a two-armed pressure lever 10 which is fulcrumed at a pivot axle 13 and which is biased in a clockwise direction by a helical spring 46 connected to the arm of the pressure lever 10 opposite to that having the forked portion 10A to urge the forked portion 10A against the anti-friction disk 14, thereby the spur gear 15 is prevented from being taken out of contact with the shaft 43. The reel shaft 43 has a two-flanged sleeve 19 affixed thereto and a frictional helical expansion spring 17 compressed between the slide or spur gear 15 and one flange 18 of the sleeve 19 and having an expansion force weaker than the pressure force applied on the slide or spur gear 15 by the pressure lever 10. The other flange 19A of the sleeve 19 is connected through a spiral spring 44 to an adapter piece adapted for engagement with the recess of the takeup reel of the cooperative tape cassette. The parts 14, 15, 17 and 18 constitute a slip clutch assembly as well as part of the driving torque control mechanism.

The operation of the apparatus shown in FIGS. 1 and 2 is as follows. Upon insertion of a tape cassette 41 into the cassette chamber 40, a forward edge of the cassette 41 abuts the projection 1B and a further insertion of the cassette 41 causes the lever 1 to turn about the axle 2 in the clockwise direction. Note the positions of the lever 1,1' shown in full and dashed lines in FIG. 2. In the dashed line positions the parts are identified by their reference numerals with an affixed prime, i.e., 1'. Such a turning movement of the lever 1 causes the guide lever 3 to turn about the shaft 4 in the clockwise direction against the force of the spring 5, thereby the helix 8B is brought into engagement with one of the teeth of the gear 15 which is initially located at the downmost position as viewed in FIG. 1, wherein the maximum driving torque is imparted to the reel drive shaft 43. When the first and second rotary drive pinions 6 and 16 are driven into synchronous rotation by the motor drive means 21, the gear 15 is caused to slowly move in the upward direction as guided by the helical thread of the helix 8B while rotating with the shaft 43 to transmit the motion of the second rotary drive pinion 16 to the reel drive shaft 43 through the frictional driving engagement of the spring 17 with the frictional flange 18, thereby the driving torque force is decreased with decrease in the frictional force of the spring 17 to the flange 18. It will be appreciated from the foregoing description that constantly changing driving torques are imparted to the winding reel of the cassette 41 with ever increasing diameters of the tape core on the winding reel. The helix 8B is so designed to have a helix angle such that the tension of the tape web withdrawn from the unwinding reel is maintained constant during the entire reeling operation, and to have an axial length relative to the axial length of the second rotary drive pinion 16 such that upon termination of the entire cassette operation, the rotating drive gear 15 is upwardly taken out of the operative relationship with the pinion 16 as guided by the helix 8B to terminate the transmission of the drive motion from the pinion 16 to the reel drive shaft 43, preventing breakage and damaging stresses on the tape from occurring.

After the entire cassette operation has been completed, the operator may remove the tape cassette 41 from the cassette chamber 40 to release the actuating lever 1 from its active state, thereupon the guide lever 3 is turned about the shaft 4 in the counter-clockwise direction under the force of the spring 5, causing the lever 1 to turn in the counter-clockwise direction in engagement of the extension 3A with the projection 1A until the projection 1C abuts the chamber wall 41A. Such a pivoting movement of the guide lever 3 causes the disengagement of the helix 8B from the gear 15 note the dashed lines 8' in FIG. 2, to the initial downmost position.

It will be seen from the foregoing description that one of the features of the present invention is the driving torque control mechanism operatively associated with the tape reel drive motion transmitting mechanism including a single slip clutch to compensate for variation in the driving torque as the quantity of the tape web wound on the winding reel varies. Another feature of the present invention is the actuating lever 1 which actuates and releases the torque control mechanism into an operative state and to an inoperative state in response to an insertion and to a removal, respectively, of the cassette into and from the cassette chamber. While the foregoing description is particularly directed to reel-to-reel cassette operation, it makes open deck operation of the reel-to-reel system efficiently feasible wherein photographic film strip and magnetic sound tapes of different characteristics may be employed with cine cameras and tape recorders for high speed picture taking operation and high speed sound recording operation, because of improved image and sound qualities and considerably reduced unit cost for the reasons that the stresses on the tape or strip between the two reels owing to differential pulls with corresponding differences in rate of rotation of the reels is maintained constant during the entire reeling operation by controlling the frictional driving torque regardless of the constantly changing diameters of the core of tape or strip on each reel. Any design which performs the necessary driving torque control function according to the invention may be utilized in such cine camera and tape recorder.

Figure 3:
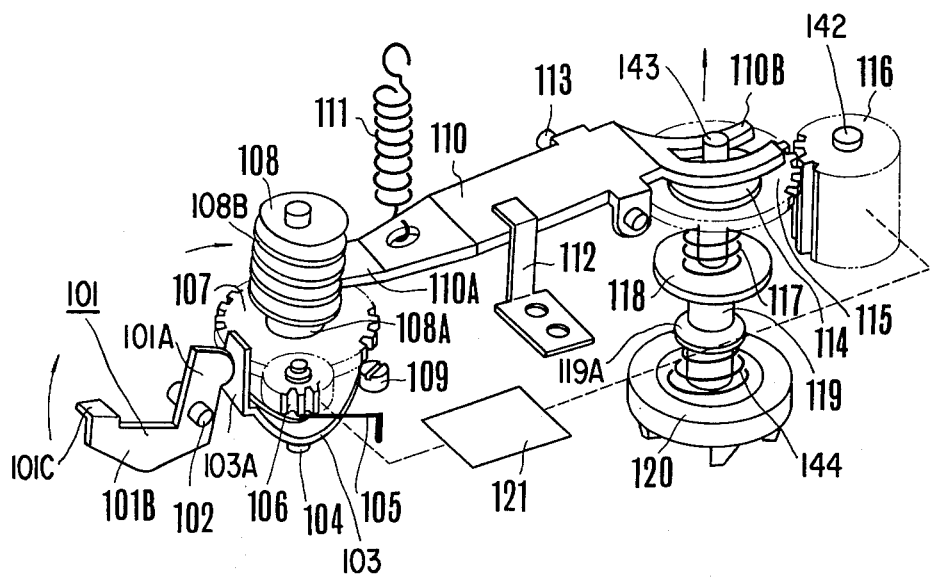
FIG. 3 is a schematic perspective view of a second tape reel drive apparatus according to the invention.
Figure 4:
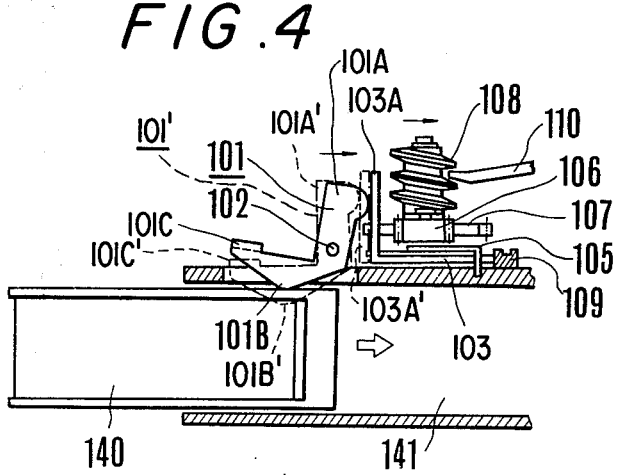
FIG. 4 is a schematic partly elevational partly sectional view of the apparatus of FIG. 3 and a cooperative tape cassete 141 which is about to be loaded in a cassette chamber 140.

In FIGS. 3 and 4, a second tape reel driving apparatus is illustrated as including an actuating member in the form of a lever 101, having three projections 101A, 101B and 101C, movably mounted at a pivot axle 102 in the housing of the apparatus to be actuated in response to an insertion of a cassette into a cassette chamber in sliding engagement with the projection 101B extending into the cassette chamber through an opening provided through a portion of the cassette chamber wall. The projection 101C is arranged on the lever 101 to limit the counter-clockwise movement of the lever when the cassette 140 is removed from the cassette chamber 141. The projection 101A normally engages an extension 103A of an one-armed guide lever 103, which is pivotable about a shaft 104 connected to motor drive means including a motor indicated at 121 independently of rotation of the shaft 104, and which is biased in a counter-clockwise direction as viewed in FIG. 3 by a spring 105 which tends to urge the extension 103A against the projection 101A. Affixed to the shaft 104 is a first rotary drive pinion 106 engaging a spur gear 107 rotatably mounted on a shaft 108 extending from the guide lever 103. The shaft 108 has a cylindrical sleeve having a helical thread on its outer surface, or a helix 108B affixed through a clamp 108A to the spur gear 107 for rotation therewith. For limiting the clockwise pivoting movement of the guide lever 103, there is provided a stopper 109. The parts 103, 104, 105, 106, 107, 108, 108A and 108B together with a torque control lever 110 constitute part of the torque control mechanism according to the invention.

A mechanism for transmitting the motion of the motor drive means to reel driving means comprises a spur gear 115 normally engaging a second rotary drive pinion 116 of which the shaft 142 is connected to the motor drive means 121. Spur gear 115 is mounted on a reel drive shaft 143 to be slidably movable along its axis as well as to be rotatable about it. The spur gear 115 carries a coaxial anti-friction disk 114 on which is abuttingly engaged a forked portion 110B of the torque control lever 110 which is fulcrumed at a pivot axle 113 and which is biased in a clockwise direction by a helical spring 111 connected to an arm 110A of the torque control lever 110 opposite to the arm 110B to urge the forked portion 110B against the anti-friction disk 114, thereby the gear 115 is prevented from being taken out of the shaft 143, when the helix 108B is disengaged from the arm end 110A. The reel drive shaft 143 has a two-flanged sleeve 119 affixed thereto and a frictional helical expansion spring 117 compressed between the gear 115 and one flange 118 of the sleeve 119 and having an expansion force weaker than the pressure force applied on the opposite side of the gear 115 by the torque control lever 110. The other flange 119A of the sleeve 119 is connected through a spiral spring 144 to an adapter piece 120 adapted for engagement with the recess of the takeup reel of the cooperative tape cassette. The parts 110, 114, 115, 117 and 118 constitute a slip clutch assembly as well as part of the driving torque control mechanism.

The operation of the second apparatus shown in FIGS. 3 and 4 is as follows. Upon insertion of a tape cassette 141 into the cassette chamber 140, a forward edge of the cassette 141 abuts the projection 1B and a further insertion of the cassette 141 causes the lever 101 to turn about the axle 102 in the clockwise direction from the position shown in dashed lines to the position shown in full lines. The parts shown in dashed lines are identified by a prime added to the reference numeral, i.e., 101'. Such a turning movement of the lever 101 causes the guide lever 103 to turn about the shaft 104 in the clockwise direction against the force of the spring 105, thereby the helix 108B is brought into engagement with the end of the arm 110A which is initially located in the uppermost position as viewed in FIGS. 3 and 4, wherein the gear 115 is located in the downmost position to impart the maximum driving torque to the reel drive shaft 143. When the first and second rotary drive pinions 114 and 116 are driven into synchronous rotation by the motor drive means 121, the torque control lever 110 is slowly turned in the counter-clockwise direction, as the arm end 110A is guided by the helical thread of the helix 108B so that the gear 115 is permitted to slowly move in the upward direction while rotating to transmit the motion of the second rotary drive pinion 116 to the reel drive shaft 143 through the frictional driving engagement of the spring 117 with the frictional flange 118, thereby the driving torque force is decreased with decrease in the frictional force of the spring 117 to the flange 118. It will be appreciated that constantly changing driving torque are imparted to the takeup reel of the cassette 141 with ever increasing diameters of the tape core on the winding reel. The helix 108B is so designed to have a helix angle such that the tension of the tape web withdrawn from the unwinding reel is maintained constant during the entire reeling operation. The clamp 108A provides a recess adapted to receive the arm end 110A of the torque control lever 110 and arranged so that when the entire reeling operation has been completed, the arm end 110A enters the recess to prevent the apparatus from being damaged by a further operation of the torque control mechanism. After the entire cassette operation has been completed, the operator may remove the tape cassette 141 from the cassette chamber 140 to release the actuating lever 101 from its active state, thereupon the guide lever 103 is turned about the shaft 104 in the counter-clockwise direction under the force of the spring 105 causing the lever 101 to turn in the counter-clockwise direction in engagement of the extension 103A with the projection 101A until the projection 101C abuts the chamber wall. Such a pivoting movement of the guide lever 103 results in the disengagement of the helix 108B from the arm end 110A causing the torque control lever 110 to turn about the axle 113 in the clockwise direction under the force of the spring 111, thereupon the gear 115 returns to its initial operative position.

Figure 5:
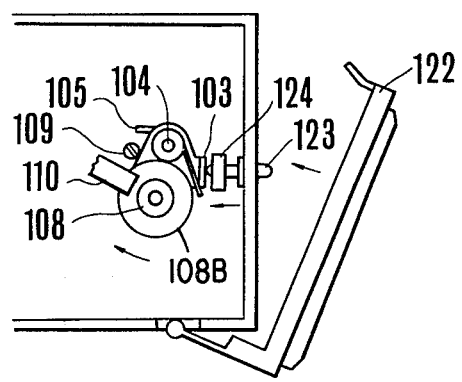
FIG. 5 is a fragmentary schematic partly elevational partly sectional view of a third tape reel drive apparatus according to the invention.
Figure 6:
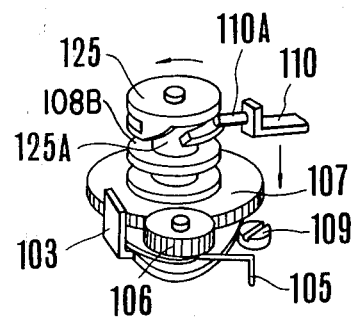
FIG. 6 is a fragmentary schematic perspective view of an arrangement of the basic parts of the torque control mechanism provided in a fourth tape reel drive apparatus according to the invention.

In the embodiment of the invention described in connection with FIGS. 1 through 4, various modifications may be devised. For example, as shown in FIG. 5, instead of constructing the actuating member for the torque control mechanism in the form of a lever 1 or 101, it is possible instead to provide a pin 123 mounted in the housing of the apparatus to be operable in response to a movement of a cover 122 of the cassette chamber, when loading a tape cassette therein, or unloading it therefrom, to actuate the pivoting movement of the guide member 103. Also in order to control the driving torque stepwisely instead of continuously, it is possible to interconnect adjacent grooves of the helix 108B in a number of points 125A spaced apart from each other by a predetermined angular distance as shown in FIG. 6.

An alternate embodiment of the invention for imparting changing driving torques to reel driving means is illustrated in FIG. 7 as including a torque control lever 110 of a form similar to that of the lever shown in FIG. 3, arranged between the motion transmitting mechanism, not shown for simplicity of illustration, and a guide member 213 in the form of a slidable L-shaped plate having a longitudinally elongated slot in which is engaged a pin 216 fixedly mounted on the housing and having a pair of shaft mounts between which a shaft 214 is rotatably mounted. The shaft 214 is biased by a spring 219 toward the initial operative position and it fixedly carries a cam disk 211 having an outer periphery providing a camming surface of continuously changing radii with angle about the axis thereof and a worm wheel 212, the cam disk 211 and the worm wheel 212 being respectively arranged on the shaft 214 so that when a cassette is inserted into and seated in the cassette chamber into which extends the projection 101B of an actuating lever 101 of a function similar to that of the lever shown in FIGS. 1 or 3, the slidable plate 213 is displaced as guided by the pin 216 against the force of a spring 218 connected between the axle 202 and the plate 213 to a position where the cam disk 211 and the worm wheel 212 engage the cam follower edge of the torque control lever 110 and the worm 215 connected to the motor drive means respectively and when the cassette is removed from the cassette chamber, the cam disk 211 and worm wheel 212 are diengaged from the lever 110 and the worm 215.

In operation of the mechanism shown in FIG. 7, when a tape cassette is inserted into the cassette chamber, the lever 101 is turned in a clockwise direction to push the plate 213, whereupon the cam disk 211 and the worm 212 are brought into engagement with the torque control lever 110 and the worm 215 respectively. The motion of the motor drive means is transmitted through the worm 215 and worm wheel 212 to the shaft 214 to turn the cam disk 211 from the minimum to the maximum radius position. As the radius of the turned cam disk in a radial direction to the cam follower edge of the torque control lever 110 increases, the lever 110 is slowly turned in the counter-clockwise direction, so that the gear 115 (see FIG. 3) is permitted to slowly move in the upward direction while rotating to transmit the motion of the rotary drive pinion 116 to the reel drive shaft 143 through the slip clutch, thereby the driving torque force is decreased with decrease in the frictional force of the spring 117 to the flange 118. On the other hand, when the tape cassette is removed from the cassette chamber, the plate 213 is displaced toward the lever 101 under the force of the spring 218 causing the cam disk 211 and the worm wheel 212 to be disengaged from the torque control lever 110 and the worm 215 respectively, thereupon the cam disk returns to its initial position under action of the spring 219 and simultaneously the torque control lever 110 is turned to its initial position under action of the spring 217.

Another alternate embodiment of the invention for imparting changing driving torque to the reel driving means is illustrated in FIG. 8 as applied to a belt drive system. An actuating member in the form of a lever 301 having two projections 301A and 301B is movably mounted on a pivot axle 302 in the housing of the apparatus to be actuated in response to an insertion of a tape cassette into a cassette chamber, both not shown, in sliding engagement with the projection 301B extending into the cassette chamber through an opening provided through a portion of the cassette chamber wall. The lever 301 is normally biased by a spring 303 in a clockwise direction as viewed in FIG. 8. The projection 101A normally engages an extension 304A of an one-armed guide lever 304 which is pivotable about a shaft 305 connected to motor drive means including a motor indicated at 323 independently of rotation of the shaft 305 and which is biased in a counter-clockwise direction by a spring 306 which is weaker than the spring 303 and which tends to urge the extension 304A against the projection 301A. Affixed to the shaft 305 is a rotary drive screw gear 307 engaging another screw gear 309 rigidly mounted on a shaft 310. The shaft 310 has a cylindrical sleeve having a helix 11 affixed thereto for rotation therewith. For limiting the counter-clockwise pivoting movement of the guide lever 304 there is provided a stopper 308. A mechanism for transmitting the motion of the motor drive means 323 to reel driving means comprises a drive pulley 316 of which the shaft 317 is connected to the motor drive means 323 and a driven pulley 319 connected by a belt 318 to the drive pulley 316 and mounted on a reel drive shaft 320 having an adapter piece 322 at the opposite end thereof adapted for engagement with the recess of the winding reel of the cooperative tape cassette. A driving torque control lever 312 is pivoted at the shaft 317 of which one arm 312A has a toothed edge for engagement with the helix 11 and the other of which carries a rotor 313 rotatably mounted on a shaft 314 extending from the lever 312. Torque control lever 312 is biased in a clockwise direction by a spring 315 which tends to turn the rotor 313 toward the belt 318.

In operation of the mechanism shown in FIG. 8, upon insertion of a tape cassette into the cassette chamber, note FIG. 2 a forward edge of the cassette abuts the projection 301B and a further insertion of the cassette causes the lever 301 to turn about the axle 302 in the counter-clockwise direction. Such a turning movement of the lever 301 causes the guide lever 304 to turn about the shaft 305 in the counter-clockwise direction under the force of the spring 306, thereby the helix 311 is brought into engagement with the teeth 312A of the torque control lever 312. When the motor drive means 323 is operated to drive the pulley 316 and gear 307 into rotation, the torque control lever 312 is caused to turn about the shaft 310 in the counter-clockwise direction as guided by the helix 311, while the belt 318 transmits the motion of the pulley 316 to the pulley 319 to drive the reel drive shaft 320 into rotation, thereby the tension on the belt 318 owing to the confrontation of the rotor 313 thereto is decreased with decrease in the frictional force of the belt 318 to the pulleys 316 and 319. It is to be understood that constantly changing driving torques are imparted to the winding reel of the cassette with ever increasing diameters of the tape core on the winding reel. The helix 311 is so designed to have a helix angle such that the tension of the tape web withdrawn from the unwinding reel in maintained constant during the entire cassette operation, and to have an axial length relative to the width of the toothed portion 312A such that upon termination of the entire cassette operation, the toothed portion 312A is taken out of the operative relationship with the helix 311 to prevent the mechanism from being damaged by the further operation of the motor drive means. After the entire cassette operation has been completed, the operator may remove the tape cassette from the cassette chamber to release the actuating lever 301 from its active state, thereupon the lever 301 is turned in the clockwise direction under the force of the spring 303 causing the guide lever 4 is turned about the shaft 305 in the clockwise direction in engagement of the extension 304A with the projection 301A. Such a pivoting movement of the guide lever 304 causes the disengagement of the helix 311 from the toothed portion 312A of the torque control lever 312, thereupon the lever 312 is permitted to turn in the clockwise direction under the force of the spring 315 about the shaft 317, and simultaneously the rotor 313 returns to its initial position where a predetermined tension is imparted to the belt 318.

It will be seen from the foregoing description that one of the features of the present invention is the driving torque control mechanism operatively associated with the tape reel drive motion transmitting mechanism including a single frictional slip clutch to compensate for variation in the driving torque as the quantity of the tape web wound on the winding reel is varied. While the foregoing description is particularly directed to reel-to-reel cassette operation, it makes open deck operation of the reel-to-reel system efficiently feasible wherein photographic film strip and magnetic sound tapes of different characteristics may be employed with cine cameras and tape recorders for high speed picture taking operations and high speed sound recording operations, because of improved image and sound qualities and significantly reduced unit cost for the reasons that the stresses on the tape or strip between the two reels owing to differential pulls with corresponding differences in rate of rotation of the reels is maintained constant during the entire reeling operation by controlling the frictional driving torque regardless of the constantly changing diameters of the core of tape or strip on the reel as it winds in.

What is claimed is:

1. In an apparatus cooperating with a reel-to-reel type cassette for driving the winding reel of the cassette through frictional driving engagement with motor drive means to take up a web material contained in the cassette, the improvement comprising, in combination:
   a. a first gear assembly including:
      1. a first drive shaft connected to said motor drive means, a first rotary drive pinion affixed to said first drive shaft;
      2. a guide member arranged to be pivotable on said first drive shaft of said first rotary drive pinion selectively between first and second operative positions; said guide member being pivotally displaced to the first position and to the second position in response to an insertion and to a removal, respectively, of said cassette into and from a chamber adapted to receive the cassette;
      3. a first spur gear mounted on said guide member to be rotatable in engagement with said first rotary drive pinion; and
      4. a cylindrical sleeve having a helical thread with a certain helical angle on its outer surface coaxially fixedly mounted on said first spur gear for rotation therewith;
   b. reel driving means arrange to be brought into engagement with the winding reel of said cassette when it is loaded in the cassette chamber, said reel driving means includes a second drive shaft;
   c. a second gear assembly including:
      1. a second rotary drive pinion connected to said motor drive means; and
      2. a second spur gear engaging said second rotary drive pinion and mounted on said second drive shaft of said reel driving means to be axially movable along the axis thereof as well as to be rotatable about it;
   d. slip clutch means for transmitting the motion of said second spur gear to said reel driving means in frictional driving engagement therewith, said slip clutch means including:
      1. a frictional disk coaxially affixed to said second drive shaft of said reel driving means, a flanged sleeve affixed to said second drive shaft and spaced thereon from said second spur gear; and
      2. a frictional expansion spring means arranged to be compressed between said second spur gear and said flanged sleeve; and
   e. a driving torque control member engaging said second spur gear and arranged to be in disengaging relationship with said cylindrical sleeve when said guide member remains in the second position, thereby serving as a means for preventing the second spur gear from being taken out of contact with its shaft under action of said expansion spring means, and to engage in the helical thread of said cylindrical sleeve when it is displaced to the first position, whereby the position of said second spur gear relative to the position of said frictional disk is adjusted by said cylindrical sleeve to impart into said reel driving means constantly changing driving torques dependent upon ever increasing diameters of the core of web material on the winding reel as it winds in, such that the stress on the web material between the reels is maintained constant during the entire cassette operation.

2. The improvement as described in claim 1, wherein said guide member is provided with means for detecting the cassette arranged to control the pivoting movement of said guide member in response to a detecting signal produced therein when inserting or removing said cassette into or from the cassette chamber.

3. The improvement as described in claim 1, wherein the attitude of said helical thread is modified to interconnect adjacent grooves at a number of points so that said torque control member assumes stepwisely different operative positions during the entire cassette operation.

4. The improvement as described in claim 1, wherein said second spur gear is provided with resetting means arranged so that when said guide member is displaced to the second position, said spur gear returns to its initial operative position.

5. In an apparatus cooperating with a reel-to-reel type cassette for driving the winding reel of the cassette through driving engagement with motor drive means to take up a web material contained in the cassette, the improvement comprising, in combination;
   a. a first gear assembly including:
      1. a first drive shaft connected to said motor drive means; a first rotary drive pinion affixed to said first drive shaft;
      2. a guide member arranged to be pivotable on said first drive shaft of said first rotary drive pinion selectively between first and second operative positions; said guide member being pivotally displaced to the first position and to the second position in responsive to an insertion and to a removal, respectively, of said cassette into and from a chamber adapted to receive the cassette;
      3. a first spur gear mounted on said guide member to be rotatable in engagement with said first rotary drive pinion; and
      4. a cylindrical sleeve having a helical thread with a certain helical angle on its outer surface coaxially affixed on said spur gear for rotation therewith;

b. reel driving means arranged to be brought into engagement with the takeup reel of said cassette when it is loaded in the cassette chamber, said reel driving means includes a second drive shaft;

c. a second gear assembly including:
   1. a second rotary drive pinion connected to said motor driving means; and
   2. a second spur gear engaging said second rotary drive pinion and arranged in said reel driving means to engage in the helical thread of said cylindrical sleeve when said guide member is displaced to the first position and to be in disengaging relationship therewith when it is displaced to the second position, said spur gear being mounted on said drive shaft of said reel driving means to be movable along the axis thereof when it engages said helical thread, as said first and second rotary drive pinions are rotated; and d. motion transmitting means for transmitting the motion of said second spur gear to said reel driving means, said motion transmitting means also acting as means for controlling the driving torque imparted thereto in accordance with the amount of sliding movement of said second spur gear, as it is guided by the helical thread.

6. The improvement as described in claim 5, wherein said guide member is provided with means for detecting the cassette arranged to control the pivoting movement of said guide member in response to a detecting signal produced therein when inserting or removing said cassette into or from the cassette chamber.

7. The improvement as described in claim 5, wherein the attitude of said helical thread is modified to interconnect adjacent grooves at a number of points so that said torque control member assumes stepwisely different operative positions during the entire cassette operation.

8. In an apparatus cooperating with a reel-to-reel type cassette for driving the winding reel of the cassette through frictional driving engagement with motor drive means to take up a web material contained in the cassette, the improvement comprising, in combination:

a. a first gear assembly including:
   1. a first drive shaft connected to said motor drive means, a rotary drive worm affixed to said first drive shaft;
   2. a slide member arranged to be movable between first and second positions, said slide member being slidingly moved to the first position and to the second position in response to an insertion and to a removal, respectively, of said cassette into and from a chamber adapted to receive the cassette;
   3. a second shaft, a worm wheel fixed to said second shaft and operatively associated with said rotary drive worm to be engaged therewith or disengaged therefrom in response to the sliding movement of the slide member; and
   4. a disk coaxially affixed to said second shaft of said worm wheel, said disk having its outer periphery configured in the form of a spiral;

b. reel driving means arranged to be brought into engagement with the winding reel of said cassette when it is loaded in the cassette chamber;

c. a second gear assembly including:
   1. a rotary drive pinion connected to said motor drive means; and
   2. a spur gear engaging said rotary drive pinion, a second drive shaft of said reel driving means mounting said spur gear so that said spur gear is axially movable along the axis thereof as well as to be rotatable about it;

d. slip clutch means for transmitting the motion of said spur gear to said reel driving means in frictional driving engagement therewith, said slip clutch means including:
   1. a frictional disk coaxially affixed to said drive shaft of said reel driving means, a flanged sleeve affixed to said second drive shaft and spaced thereon from said spur gear; and
   2. a frictional expansion spring means arranged to be compressed between said spur gear and said flanged sleeve; and e. a driving torque control member engaging said spur gear and arranged to be in disengaging relationship with said spiral disk when said slide member remains in the second position, thereby serving as a means for preventing the spur gear from being taken out of contact with said second drive shaft under action of said expansion spring, and to engage the outer periphery of said spiral disk when it is displaced to the first position, thereby the position of said spur gear relative to the position of said frictional disk is adjusted by said spiral disk to impart into said reel driving means constantly changing torques dependent upon ever increasing diameters of the core of web material on the winding reel as it winds in, such that the stress on the web material between the reels is maintained constant during the entire cassette operation.

9. The improvement as described in claim 8, wherein said slide member is provided with means for detecting the cassette arranged to control the sliding movement of said slide member in response to a detecting signal produced therein when inserting or removing said cassette into or from the cassette chamber.

10. The improvement as described in claim 8, wherein said spur gear is provided with resetting means arranged so that when said spiral disk is disengaged from the torque control member, said spur gear returns to its initial operative position.

11. In an apparatus provided in a motion picture camera cooperating with a reel-to-reel type cassette for driving the winding reel of the cassette through frictional driving engagement with motor drive means to take up a film strip contained in the cassette, the improvement comprising, in combination:

a. a first gear assembly including:
   1. a first drive shaft connected to said motor drive means, a first rotary drive pinion affixed to said first drive shaft;
   2. a guide member arranged to be pivotable on said drive shaft of said first rotary drive pinion selectively between first and second operative positions, said guide member being pivotally displaced to the first position and to the second position in response to a closing and to an opening, respectively, of the cover of the cassette chamber of said camera;
   3. a first spur gear mounted on said guide member to be rotatable in engagement with said first rotary drive pinion; and
   4. a cylindrical sleeve having a helical thread with a certain helical angle on its outer surface coaxially fixedly mounted on said first spur gear for rotation therewith;

b. reel driving means arranged to be brought into engagement with the winding reel of said cassette when it is loaded in the cassette chamber, said reel driving means includes a second drive shaft;

c. a second gear assembly including:
1. a second rotary drive pinion connected to said motor drive means; and
2. a second gear engaging said second rotary drive pinion and mounted on said second drive shaft of said reel driving means to be axially movable along the axis thereof as well as to be rotatable about it;

d. slip clutch means for transmitting the motion of said second spur gear to said reel driving means in frictional driving engagement therewith, said slip clutch means including:
1. a frictional disk coaxially affixed to said second drive shaft of said reel driving means, a flanged sleeve affixed to said second drive shaft and spaced thereon from said second spur gear; and
2. a frictional expansion spring means arranged to be compressed between said second spur gear and said flanged sleeve; and e. a driving torque control member engaging said second spur gear and arranged to be in disengaging relationship with said cylindrical sleeve when said guide member remains in the second position, thereby serving as a means for preventing the second spur gear from being taken out of contact with said second drive shaft under action of said expansion spring means, and to engage in the helical thread of said cylindrical sleeve when it is displaced to the first position, whereby the position of said second spur gear relative to the position of said frictional disk is adjusted by said cylindrical sleeve to impart into said reel driving means constantly changing driving torques dependent upon ever increasing diameters of the core of film strip on the winding reel as it winds in, such that the stress on the film strip between the reels is maintained constant during the entire cassette operation.

12. The improvement as described in claim 11, wherein said guide member is provided with means for detecting the closing and opening of the cassette chamber cover to control the pivoting movement of said guide member in response to a detecting signal produced therein when the cover is closed or opened.

13. The improvement as described in a claim 11, wherein said second spur gear is provided with resetting means arranged that when said guide member is displaced to the second position, said spur gear is permitted to return to its initial operative position.

14. In an apparatus for driving a winding reel in frictional driving engagement with motor drive means to take up a web material from an unwinding reel, the improvement comprising, in combination:

a. a first rotary drive assembly connected to said motor drive means, said first rotary drive assembly including:
1. a first drive shaft connected to said motor drive means, a guide member arranged to be movable about said first drive shaft selectively between first and second operative positions, said guide member being displaced to the first position and to the second position in response to a loading and to an unloading, respectively, of the reels of said web material into and from the apparatus; and
2. an axle extending from said guide member, a rotary cylindrical member having a helical thread with a certain helical angle on its outer surface coaxially mounted on said axle extending from the guide member to be rotatable in connection with said first drive shaft of said first rotary drive assembly;

b. spindle driving means arrange to receive the winding reel of said web material when it is loaded in the apparatus, said spindle driving means including a second drive shaft;

c. a second rotary drive assembly arranged on said spindle driving means to be movable along said second shaft of said spindle driving means as well as to be rotatable about it in connection with said motor drive means;

d. slip clutch means for transmitting the motion of said second rotary drive assembly to said spindle driving means in frictional driving engagement therewith, said slip clutch means including:
1. a frictional disk coaxially affixed to said second drive shaft of said spindle driving means; and
2. a frictional expansion spring means arranged on said second drive shaft to be compressed between said second rotary drive assembly and said frictional disk; and e. a driving torque control member engaging said second rotary drive assembly and arranged to be in disengaging relationship with said helical thread when said guide member remains in the second position, thereby serving as a means for preventing the second rotary drive assembly from being taken out of contact with said second drive shaft of the spindle driving means under action of said expansion spring means, and to engage said helical thread when it is displaced to the first position, whereby the position of said second rotary drive assembly relative to the position of said frictional disk is adjusted by said cylindrical member to impart into said spindle driving means constantly changing driving torques dependent upon ever increasing diameters of the core of web material on the winding reel as it winds in, such that the stress on the web material between the reels is maintained constant during the entire reeling operation.

15. In an apparatus for driving a winding reel in frictional driving engagement with motor drive means to take up a web material from an unwinding reel, the improvement comprising, in combination:

a. a first rotary drive assembly connected to said motor drive means, said first rotary drive assembly including:
1. a first drive shaft connected to said motor drive means, a guide member arranged to be pivotable on said first drive shaft of said rotary drive assembly selectively between first and second operative positions, said guide member being pivotally displaced to the first position and to the second position in response to a loading and to an unloading, respectively, of the reels of said web material into and from the apparatus; and
2. an axle extending from said guide member, a rotary cylindrical member having a helical thread with a certain helical angle on its outer surface coaxially mounted on said axle extending from the guide member to be rotatable in connection with said first drive shaft of said first rotary drive assembly;

b. spindle driving means arrange to receive the winding reel of said web material when it is loaded in the apparatus, said spindle driving means including a second drive shaft;

c. a second rotary drive assembly arranged on said spindle driving means to engage in the helical thread of said cylindrical member when said guide member is displaced to the first position and to be in disengaging relationship therewith when it is displaced to the second position, said second rotary drive assembly being mounted on said second drive shaft of said spindle driving means to be movable along the axis thereof when it engages said helical thread, as said first and second rotary drive assemblies are rotated; and d. motion transmitting means for transmitting the motion of said second rotary drive assembly to said spindle driving means, said motion transmitting means also acting as a means for controlling the driving torque imparted thereto in accordance with the amount of sliding movement of said second rotary drive assembly, as it is guided by the helical thread.

16. In an apparatus for driving a winding reel in frictional driving engagement with motor drive means to take up a web material from an unwinding reel, the improvement comprising, in combination:

a. a slide member arranged to be slidingly movable between first and second positions, said slide member being moved to the first position and to the second position in response to a loading and to an unloading, respectively, of the reels of said web material into and from the apparatus; and including 1. a first rotary means arranged selectively to be engaged with and disengaged from said slide member in response to the sliding movement of said slide member;

2. second rotary means arranged on the same axis of said first rotary means to be rotatable in cooperating with said first rotary means, the outer periphery of said second rotary means being configured in the form of a spiral;

b. spindle driving means arranged to receive the winding reel of said web material when it is loaded in the apparatus said spindle driving means including a drive shaft;

c. third rotary means arranged on said spindle driving means to be slidably movable and rotatable in connection with said motor drive means;

d. slip clutch means for transmitting the motion of said third rotary means to said spindle driving means in frictional driving engagement therewith, said slip clutch means including:

1. a frictional disk coaxially affixed to said drive shaft of said spindle driving means; and 2. a frictional expansion spring means arranged on said drive shaft to be compressed between said third rotary means and said frictional disk;

e. a driving torque control member engaging said third rotary means and arranged to be in disengaging relationship with said spiral disk when said slide member remains in the second position, thereby serving as a means for preventing the third rotary means from being taken out of contact with said shaft of said spindle driving means under action of said expansion spring means, and to engage the outer periphery of said spiral disk when it is displaced to the first position, thereby the position of the third rotary means relative to the position of said frictional disk is adjusted by said spiral disk to impart into said spindle driving means constantly changing torques dependent upon ever increasing diameters of the core of web material on the winding reel as it winds in, such that the stress on the web material between the reels is maintained constant during the entire reeling operation.

* * * * *